W. F. CLAYTON
PLOW FENDER.
APPLICATION FILED SEPT. 27, 1916.

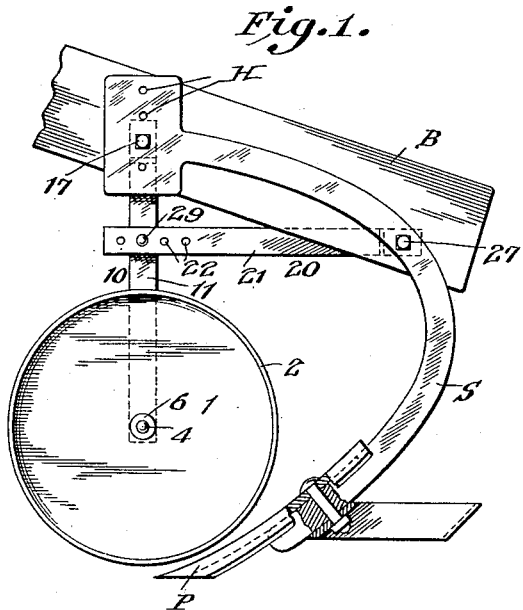

1,220,071.

Patented Mar. 20, 1917.
2 SHEETS—SHEET 2.

Inventor
William F. Clayton

By Beall + Fenwick
Attorneys

UNITED STATES PATENT OFFICE.

WILLIAM FRANKLIN CLAYTON, OF CULLMAN COUNTY, ALABAMA, ASSIGNOR OF ONE-HALF TO WILLIAM EARL JAMES, OF CULLMAN, ALABAMA.

PLOW-FENDER.

1,220,071.  Specification of Letters Patent.  Patented Mar. 20, 1917.

Application filed September 27, 1916. Serial No. 122,539.

*To all whom it may concern:*

Be it known that I, WILLIAM FRANKLIN CLAYTON, a citizen of the United States, residing in the county of Cullman and State of Alabama, have invented certain new and useful Improvements in Plow-Fenders; and I do hereby declare the following to be a full, clear, and exact description of the invention, such as will enable others skilled in the art to which it appertains to make and use the same.

This invention relates to plows, and more especially to fenders; and the object of the same is to mount a disk-like fender to one side and slightly in advance of the plow shovel or point, so as to limit the amount of earth turned up which is thrown toward the plants when the plow is used for cultivating. The invention consists in the details of the structure for supporting the fender and for permitting its adjustment, all as hereinafter more fully described and claimed, and as shown in the drawings wherein:—

Figure 1 is a side elevation and Fig. 2 a front elevation of one type of this fender in which the disk is mounted on a fixed pivot, Fig. 3 is a sectional view through the disk on an enlarged scale, Figs. 4 and 5 are perspective details of the parts of the framework, and Fig. 6 is a perspective detail of the parts of the plow or cultivator structure slightly separated.

No novelty is claimed for the beam B, standard S, and plow shovel or point P, and the attachment purposely has some of its adjustments for the sake of adapting it to different types of points or shovels although its adjustments are mainly to adapt it to the character of the soil, the plants being treated, and the nature of the treatment which it is desired to give them.

Figure 8:
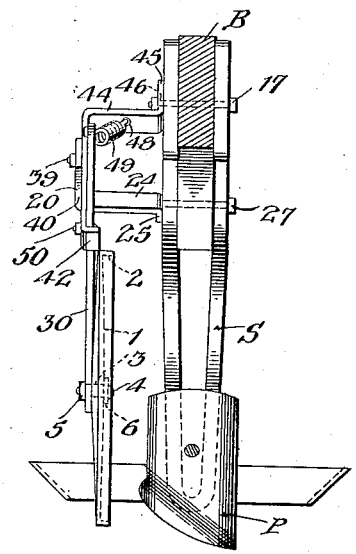

The fender itself is preferably of disk-like shape, having an upright body 1 with a peripheral flange 2 projecting toward one side and which may well be called the inside because it is next the plow as best seen in Figs. 2 and 8. The body of this disk is centrally mounted on a stud 3 which in turn is mounted on a bolt 4 adapted to pass through one member of the framework described below and to receive a nut 5 or other fastening means which clamps the supporting member against the end of the stud and yet leaves the disk free to revolve thereon. The stud preferably has a wide head 6 at its inner side to prevent dirt from getting into the bearing.

In the type of my invention shown on Sheet 1, the hanger 10 has a straight upright body 11 pierced with a number of holes 12 through any of which the bolt 4 may be passed, and pierced also with an additional hole 13. At the upper end of the body is an elbow or offset 14, and beyond this offset is an upstanding lip 15 having a hole 16 to receive a bolt 17 which passes through the standard and beam as seen in Fig. 2 and supports the hanger therefrom with its body standing vertical and to one side of the standard and plow point, and with the disk disposed in relation to the latter about as seen in Figs. 1 and 2. The numeral 20 designates a brace, also preferably composed of strap iron, and having a straight body 21 pierced near its front end with a number of holes 22 and having at its rear end an elbow or offset 24 beyond which is a lip 25 having a hole 26 to receive a bolt 27 which passes through the beam or standard or both of them as seen in Figs. 1 and 2. This brace stands about horizontal, and when the parts of the frame are assembled a bolt 29 is passed through one of the holes 22 and the single hole 13 and connects the brace with the hanger so as to hold the latter rigid. Ordinarily this hanger will stand about vertical as seen in Fig. 1, and if the offset 24 is about as long as the offset 14 the brace will stand very nearly in the same vertical plane as the hanger, which plane is offset to one side of the central line through the standard as seen in Fig. 2. The holes 22 are for the purpose of adjusting the hanger forward or backward, and the holes 12 are for the purpose of adjusting the stud and therefore the disk vertically, and in addition other holes H may be provided in the standard so that the bolt 17 can be passed through any of them.

Figure 7:
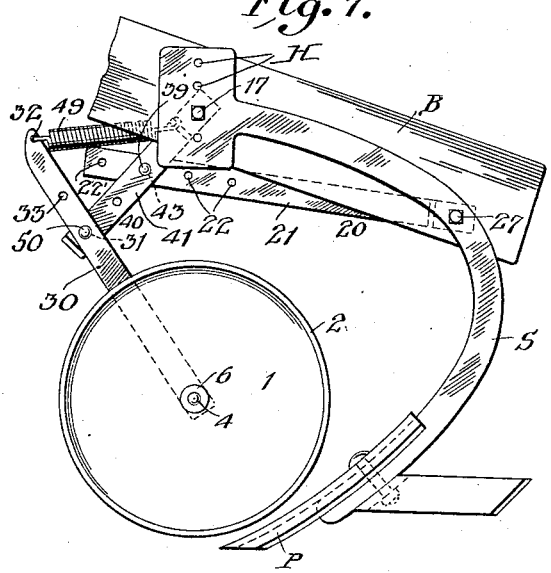
Fig. 7 is a side elevation and Fig. 8 a front elevation of another type of this invention wherein the disk is mounted on a swinging hanger, Fig. 9 a perspective detail of the framework and hanger used in this case, and Fig. 10 a side elevation showing how the parts of this framework can be connected up so as to make the hanger rigid.
Figure 9:
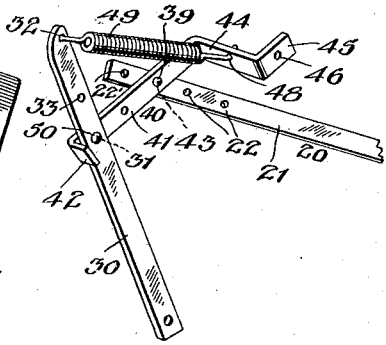

In the type of my invention shown on Sheet 2, the disk and its pivot may be the same as in Fig. 1. The standard 30 is here a straight bar whose lower end supports the stud and whose upper end is provided with holes 31 and 32 and another hole 33 between them. The brace is to all intents the same as described above, and I have numbered it 20. A third element is herein employed, which I will call a bracket 40. It has a straight body 41 hooked to one side at its lower or front end as at 42, pierced within its length with a hole 43, and having at its rear end an elbow or offset 44 and beyond the same a lip 45 having a hole 46, which hole is to receive the bolt 17 as seen in Figs. 7 and 8. The offset may also be pierced with a hole 48, and a coiled spring 49 has its extremities connected with this hole and with the extreme uppermost hole 32 in the hanger. Through the lowermost hole 31 therein passes a pivot bolt 50, which also passes through the body 41 of the bracket just in rear of its hook 42; and through the hole 43 in said body is passed a bolt 39 which also passes through one of the holes 22 in the brace 20. The parts now stand as seen in Fig. 7, and the tension of the spring 49 turns the hanger so that its front edge is borne normally against the hook 42 as perhaps best seen in Fig. 9. With the parts properly adjusted, the disk fender will now stand to one side of the plow point P as seen in Fig. 8 and with its stud or pivot about over the tip of the point as seen in Figs. 7 and 2. When now a plow with this type of my attachment is drawn through the soil, the ground thrown up by the point strikes the disk, and only so much of it can pass the disk toward the plants as the position of the disk permits—therefore the adjustments of this type are useful like those of the simpler type for setting the fender to suit each individual case. When now, however, an obstruction in the ground is reached, it is possible for the disk to move to the rear as the hanger can swing on its pivot 50 and expand the spring 49, but as soon as the obstruction is passed the hanger and disk return to their normal position and the front edge of the former rests on the hook 42.

Figure 10:
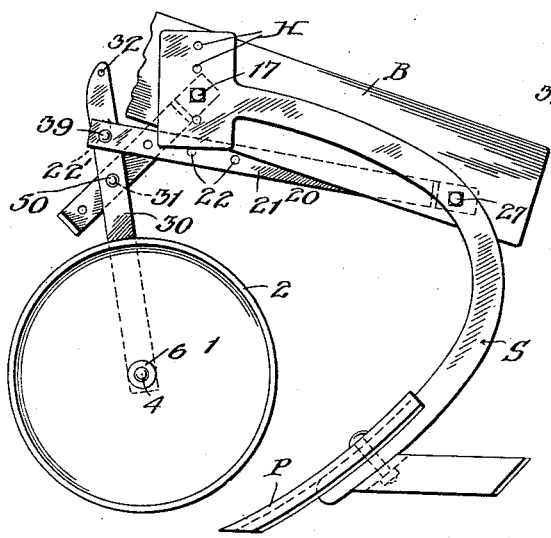

I have shown in Fig. 10 how the pivoted type of my fender-support can be converted into a fender mounted on a fixed support. In this case I disconnect the brace from the bracket by withdrawing the bolt 39, then drop the front end of the brace to a point below the disk and bring it up on the other or inner side of the same; then I loosen the bolt 17 and swing the bracket slightly downward, and finally I reinsert the bolt 39 through the forward hole 22' in the brace and the intermediate hole 33 in the hanger, and tighten up the nuts on all bolts. The hanger is now held to the beam and standard by both the bracket and the brace, and the spring can be removed or permitted to remain, but the disk is now mounted on a stationary pivot and will not swing to the rear.

It will therefore be seen that it is possible to make my invention in a simpler form as shown on Sheet 1 of the drawings, where it is never contemplated that the support for the disk shall swing; or it can be made in the form shown on Sheet 2 of the drawings where the disk-hanger is pivotally supported and is held to its working position with yielding force so that it may swing when an obstruction is encountered by the disk, and it is quite possible to convert this type of my attachment into a rigidly supported hanger by proper disposition of the parts. In either case I provide the parts with plenty of holes for adjustment purposes so that not only can the attachment be applied to plows of various types but it can be adjusted after its application to adapt it to various conditions of the soil and the plants.

What is claimed as new is:

1. A fender attachment for plows, in combination with a plow beam and a standard attached thereto having at its forward upper end plates with a vertical series of transverse apertures, a hanger having an offset perforated arm connected adjustably to and depending from one of said plates, the hanger having an aperture intermediate its ends and bearing a fender disk, a brace pivoted at its rear end upon the beam and standard and having its forward end perforated with a longitudinal series of apertures, and a fastening device insertable through any selected aperture of the brace when alined with the respective aperture in the bracket whereby said parts are positively locked in adjusted relation against slipping.

2. In a fender attachment for plows, the combination with a disk, and a hanger to whose lower end the disk is pivoted; of a bracket having an offset rear end adapted to be attached to the plow standard and a hook at its front end, a pivot uniting the hanger with the bracket adjacent said hook, and a spring connecting the upper end of the hanger with the bracket, for the purpose set forth.

3. In a fender attachment for plows, the combination with a disk, and a hanger to whose lower end the disk is pivoted; of a bracket having a hook at its lower end, a pivotal connection between the hanger and bracket adjacent its hook, a spring connecting the hanger and bracket and throwing the former normally against the rear side of the hook, adjustable means for attaching the upper end of the bracket to the plow standard, and a brace adjustably connected with the bracket between its ends and also adapted for attachment to the plow standard.

4. In a plow, a plow point and a beam to which it is connected, a bracket pivotally connected to the beam at a point substantially vertically above the forward tip of the plow point, a brace connectible adjustably to the bracket and which extends rearwardly and is pivotally connected to the beam, a hanger pivotally connected to the bracket and carrying a fender disk disposed with its periphery adjacent to and parallel with the plow point, and a spring connecting the hanger and a rigid part of the structure to yieldingly thrust the disk downward.

5. In a plow, a support, carrying a plow point, a bracket adjustably connected to said support, a member pivoted on the bracket and carrying a fender disk, and a brace connected to said support and adaptable for connection either to said bracket or to said menber to hold either in adjusted position.

6. In a plow, a support, carrying a plow point, a bracket adjustably connected to said support and provided with a series of apertures, a member having a series of perforations pivoted on the bracket at one of said apertures and carrying a fender disk, a brace connected to said support and adaptable for connection either to said bracket at one of said perforations or to said member to hold either in adjusted position, and means for yieldingly supporting the disk when said brace is connected to said member, and permitting it to swing vertically beside said point.

In testimony whereof I affix my signature.

WILLIAM FRANKLIN CLAYTON.

Copies of this patent may be obtained for five cents each, by addressing the "Commissioner of Patents, Washington, D. C."